(12) United States Patent
Burger (10) Patent No.: US 11,364,099 B2
(45) Date of Patent: Jun. 21, 2022

(54) DENTAL PROSTHESIS PRODUCTION DEVICE AND DENTAL PROSTHESIS

(71) Applicant: Ivoclar Vivadent AG, Schaan (LI)

(72) Inventor: Goran Burger, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 302 days.

(21) Appl. No.: 16/654,180

(22) Filed: Oct. 16, 2019

(65) Prior Publication Data

US 2020/0046471 A1 Feb. 13, 2020

Related U.S. Application Data

(63) Continuation of application No. 14/915,337, filed as application No. PCT/EP2015/061442 on May 22, 2015, now abandoned.

(30) Foreign Application Priority Data

May 27, 2014 (EP) .................................... 14169982

(51) Int. Cl.
*A61C 8/00* (2006.01)
*A61C 13/00* (2006.01)
*A61C 3/02* (2006.01)

(52) U.S. Cl.
CPC .............. *A61C 8/0066* (2013.01); *A61C 3/02* (2013.01); *A61C 8/005* (2013.01); *A61C 8/006* (2013.01);
(Continued)

(58) Field of Classification Search
CPC ............ A61C 13/0004; A61C 13/0019; A61C 8/0066; A61C 8/005; A61C 8/0054;
(Continued)

(56) References Cited

U.S. PATENT DOCUMENTS 4,758,161 A 7/1988 Niznick
5,527,182 A 6/1996 Willoughby
(Continued)

FOREIGN PATENT DOCUMENTS

EP 1459700 A1 * 9/2004 .......... A61C 8/0069
EP 2025303 A1 * 2/2009 ......... A61C 13/0004
(Continued)

*Primary Examiner* — Jacqueline T Johanas
*Assistant Examiner* — Shannel Nicole Belk
(74) *Attorney, Agent, or Firm* — Ann M. Knab; Thad McMurray (57) ABSTRACT

The invention relates to a dental prosthesis production device and method of manufacturing a dental prosthesis in which the dental prosthesis has an implant (40) and an abutment (10) which has a shape that is compatible with the implant (40) and on or to which abutment a dental structure (28) that is made of a dental material, in particular ceramic and/or plastic, and produced with the aid of a CAM process using rapid prototyping or compression molding technology can be secured. The abutment is mounted on the implant (40) via a releasable connection, in particular a screw connection (44), having an anti-rotation mechanism (50), and an anti-rotation device (groove 22) is formed between the abutment (10) and the dental structure (28). A selection device (66) is provided for abutments, said selection device allowing a selection of the abutment (10) for producing the dental prosthesis, optionally after reducing the abutment height to a specified value in a patient-specific manner, and a machining tool, in particular a milling cutter, or a CAM device is provided for shortening the abutment (10).

16 Claims, 4 Drawing Sheets

(52) U.S. Cl.
CPC .......... *A61C 8/0016* (2013.01); *A61C 8/0054* (2013.01); *A61C 8/0059* (2013.01); *A61C 8/0068* (2013.01); *A61C 13/0003* (2013.01); *A61C 13/0004* (2013.01)

(58) Field of Classification Search
CPC ..... A61C 8/006; A61C 8/0059; A61C 8/0068; A61C 8/0084; A61C 8/0069; A61C 8/0089

See application file for complete search history.

(56) References Cited

U.S. PATENT DOCUMENTS

| | | | |
|---|---|---|---|
| 5,829,977 | A | 11/1998 | Rogers et al. |
| 5,888,218 | A | 3/1999 | Folsom |
| 5,951,288 | A | 9/1999 | Sawa |
| 6,116,904 | A | 9/2000 | Kirsch et al. |
| 6,168,436 | B1 | 1/2001 | O'Brien |
| 6,431,866 | B2 | 8/2002 | Hurson et al. |
| 2003/0082498 | A1* | 5/2003 | Halldin ................ A61C 8/0001 433/173 |
| 2003/0082499 | A1* | 5/2003 | Halldin ................ A61C 8/0001 433/173 |
| 2003/0113690 | A1* | 6/2003 | Hollander ............ A61C 8/0066 433/173 |
| 2004/0076924 | A1 | 4/2004 | Kim |
| 2004/0106087 | A1 | 6/2004 | Weigl et al. |
| 2004/0121286 | A1 | 6/2004 | Aravena et al. |
| 2004/0185417 | A1 | 9/2004 | Rassoli |
| 2005/0136379 | A1 | 6/2005 | Niznick |
| 2005/0181330 | A1 | 8/2005 | Kim et al. |
| 2007/0037122 | A1 | 2/2007 | Bassett et al. |
| 2007/0298379 | A1* | 12/2007 | D'Alise ................ A61C 8/0025 433/174 |
| 2008/0241789 | A1 | 10/2008 | Mundorf |
| 2008/0280255 | A1* | 11/2008 | D'Alise ................ A61C 8/0069 433/174 |
| 2009/0042167 | A1 | 2/2009 | Van Der Zel |
| 2009/0047629 | A1 | 2/2009 | Kim |
| 2010/0151421 | A1 | 6/2010 | Devengencie et al. |
| 2010/0196851 | A1* | 8/2010 | Konig ................ A61C 8/0066 433/173 |
| 2010/0209877 | A1 | 8/2010 | Hogan et al. |
| 2011/0014586 | A1 | 1/2011 | Jorneus et al. |
| 2011/0123948 | A1 | 5/2011 | Hinrichsen |
| 2011/0189633 | A1* | 8/2011 | Schneck ................ A61C 8/005 433/174 |
| 2012/0077149 | A1* | 3/2012 | Ospelt ................ A61C 8/005 433/173 |
| 2012/0214130 | A1 | 8/2012 | Krivoruk et al. |
| 2012/0214133 | A1* | 8/2012 | Jung ................ A61C 13/0022 433/174 |
| 2012/0237902 | A1* | 9/2012 | Maniscalco ............ A61C 8/005 433/201.1 |
| 2012/0270179 | A1 | 10/2012 | Holmstrom et al. |
| 2012/0295223 | A1* | 11/2012 | Robb ................ A61C 8/005 433/173 |
| 2012/0295226 | A1 | 11/2012 | Robb et al. |
| 2013/0108986 | A1 | 5/2013 | Lee |
| 2014/0205969 | A1 | 7/2014 | Marlin |
| 2015/0017603 | A1* | 1/2015 | Antonini ................ A61C 8/005 433/173 |
| 2015/0104665 | A1 | 4/2015 | Beeby |
| 2017/0312059 | A1 | 11/2017 | Burger |

FOREIGN PATENT DOCUMENTS

| | | |
|---|---|---|
| KR | 20100090564 A | 8/2010 |
| WO | 2013128406 A2 | 9/2013 |

* cited by examiner

DENTAL PROSTHESIS PRODUCTION DEVICE AND DENTAL PROSTHESIS

CROSS-REFERENCE TO RELATED APPLICATIONS

This application is a continuation application and claims priority to U.S. application Ser. No. 14/915,337, filed Feb. 29, 2016, which is the National Stage application of International patent application PCT/EP2015/061442 filed on May 22, 2015, which claims priority to European patent application No. 14169982.7 filed on May 27, 2014, all the disclosures of which are incorporated herein by reference in their entirety.

FIELD OF THE INVENTION

The invention relates to a dental prosthesis production device, a dental prosthesis, and a method.

BACKGROUND

In many cases, dental prostheses are attached in the mouth of a patient with the help of an implant. In these cases, the implant is typically provided with a so-called abutment after it has been inserted, which is connected to the implant in a geometrically true manner, for instance by configuring the surfaces of the implant and the abutment which face one another in an untrue or non-circular manner. The attachment itself is then carried out by means of an abutment screw which penetrates the abutment. For this purpose, an upper area of the abutment is configured as a tubing section whose internal diameter is sufficient for receiving the abutment screw. The abutment screw is supported slightly below this tubing section on a slightly conical supporting area in most cases, whose internal diameter is smaller than the diameter of the head of the abutment screw but wide enough to fit the shank and the thread of the abutment screw. In this case, the implant comprises an internal thread in a way known per se for threaded engagement with the thread of the abutment screw.

Subsequent to the attachment of the abutment to the implant a dental structure is attached to the abutment. For this purpose, the tubing section or the upper area of the abutment is slightly conical on the outside in most cases and fits into a corresponding recess in the dental structure in a geometrically true manner.

Solutions of this kind have been used for approximately 30 years; in this respect, it is referred to DE 32 41 963 C1 or GB 2 119 258 A by way of example.

However, particularly with the solution according to the latter document the problem arises that the rotary position of the dental structure relative to the implant is not or not explicitly determined. In this respect, a better and somewhat newer solution is disclosed in U.S. Pat. No. 5,782,918 A1, which is hereby incorporated by reference, which shows an anti-rotation device in the form of a flattened portion at the tubing section of the abutment and which, in this respect, realizes an anti-rotation device between implant and dental structure.

In this solution only one single size or height of the abutment is provided which is kept small such that even more compact dental structures cover the tubing section completely.

Contrary to this, it has been suggested recently to have ready different sizes of abutments which causes corresponding storage efforts and optionally also possibilities of confusion, or which gives the dentist or dental technician expensive post-processing efforts by leaving to him/her the task of adjusting to the size ratios and the oral situation of the patient.

However, this is unsatisfactory, the more so as the dentist or dental technician sometimes overlooks that a sufficient support surface must be available for the transmission of power in order to transmit the shear forces introduced during masticatory movements securely and permanently when the size of the abutment changes, for instance by cutting the tubing section to a desired height.

By making corresponding changes, in many cases the warranty claims against the manufacturer are violated such that the dentist or dental technician bears the full liability risk which is considered unsatisfactory for understandable reasons.

Furthermore, it has become apparent that in spite of a basically sufficiently dimensioned support surface between the dental structure and the implant material fracture has occurred in individual cases, especially with ceramic dental structures which are prone to brittle fractures compared to dental structures consisting of a composite or plastic material.

In many cases, in the upper part of the tubing section of the abutment flanges are provided which extend radially towards the outside and which are intended to be in engagement with corresponding grooves in the dental structure in order to provide the desired anti-rotation device. If this area is sawed off without further ado, the anti-rotation mechanism is not available anymore; if, on the other hand, the abutment is used for abutment teeth of a bridge, the anti-rotation device which exists in this connection can be disturbing in some cases as in this case an angularly accurate orientation to, for instance, less than 1° would be necessary to avoid tensions.

SUMMARY

Contrary to this, the invention is based on the task of providing a dental prosthesis production device, a dental prosthesis and a method which take account of the requirements presented to the dental prosthesis consisting of implant, abutment and dental structure in an improved manner and which make it possible to handle the production of the dental prosthesis by the dentist or dental technician in conformity with warranty claims.

This task is inventively solved by the claims and sub-claims.

According to the invention it is particularly favorable that the production device itself comprises a selection device for abutments. The data of the dental structure produced by means of CAM, compression molding technology or rapid prototyping has been defined beforehand and is present in the production device, such that according to the invention it is particularly favorable that the load-carrying capacity of the power transmission surfaces between abutment and dental structure, the remaining wall thickness of the dental structure, the angular orientation, the height level, etc., can be defined beforehand and in a predetermined manner by the production device.

Alternatively, a compression molding technology can also be used, and in this respect it is referred to the entire document EP 1 915 972 A1 by way of example.

According to the invention it is favorable that in this way the abutments can be selected based on the existing dimensioning of the abutments and that the adjusted configuration of the bearing surfaces of the dental structure on the abutment can be specified for the CAM device. Shortening the abutment can be performed by means of a machining tool, in particular a milling cutter, or a CAM device.

In an advantageous embodiment it is possible to get by with only one abutment which can then be shortened to a patient-specific height by means of the CAM device or optionally by means of a separate milling cutter controlled by it. In this way, the disadvantages of a shortening process by cutting off, in particular the disadvantages of a shortening process by manually cutting off can be avoided without further ado; for instance, slants or radii at the upper end of the tubing or cylindrical section of the abutment can be provided by means of the inventively advantageous embodiment of an automatic shortening process such that observed brittle fractures of ceramic dental structures that have been caused by local tensile stresses at the inner corners of the dental structures can be prevented reliably.

In an inventively advantageous embodiment it is provided to provide a groove or a plurality of grooves which extend(s) vertically almost across the entire height of the upper area of the abutment which is referred to as tubing section herein. This embodiment comprising the anti-rotation device has the advantage that it is also effective in this respect if the height of the tubing section is reduced in accordance with the advantageous embodiment. Furthermore, by realizing flanges according to the groove and tongue principle in the radial inner surface of the dental structure the inventive anti-rotation device can be ensured with the desired reliability.

If, on the other hand, the inventive dental prosthesis is configured as a bridge such that an additional anti-rotation device is not only undesirable but also disturbing the CAM device simply omits or does not produce the corresponding flanges such that the desired ability to rotate for a stress-free mounting of the bridge is given.

The fact that an exceptionally high precision of the fit between the dental structure and the abutment is realized inventively, does not prevent the provision of a provided adhesive joint which serves in particular to adjust the resilience of the dental prosthesis compared to the antagonist.

In fact, by means of the inventive CAM production the desired adhesive gap can be set at an exceptionally great accuracy of, for instance, 50 m.

According to the invention it is particularly favorable that the mistakes that have previously been made in the adjustment of the height of the abutment are suppressed quasi automatically. The milling process automatically defines the curves and radii as can be provided in a stress-related limited manner. An unintentional reduction and thus a decrease of the support surface are precluded, just like an unintentional confusion of the abutments which are adjusted to the corresponding dental structure, respectively. Finishing, such as roughening or the like, is not required; in fact, as part of the CAM production the abutment can, for instance, also be coated and thus be given a desired color in any suitable manner, wherein it is to be understood that the degree of roughness of the coating is adapted to the requirements.

The upper area of the abutment can be shortened to standard dimensions in any suitable manner such that the inner surfaces of the dental structure can also be configured with standard dimensions.

Here, the configuration of the arrangement of grooves in the upper area of the implant, as discussed above, can be used as an anti-rotation device but also, for instance, a respective untrue or non-circular configuration at a collar of the implant which is engaged with the dental structure.

In an advantageous embodiment it is provided that the desired shape of the dental prosthesis is determined based on an extraoral or intraoral 3D scan with the aid of a scanbody whose cylindrical geometry comprises a bevel or a ball-shaped reference surface in order to enable the determination and transfer of the initial situation (model) into 3D data (scan). For this purpose, the scanning result is supplied to a CAD device which, based on the shape of neighboring teeth of the desired dental prosthesis, forms a virtual shape of the restoration to be produced and divides it virtually into an implant, an abutment and a dental structure—optionally after the intervention of a user.

Here, an abutment refers to any desired meso-structure, that is to say any structure which extends between the implant and the dental structure which is also referred to as suprastructure, wherein it is to be understood that single-unit but also multi-unit dental abutment structures can be realized basically.

It is to be understood that the outer surface of the tubing section of the abutment can be provided with drain channels for adhesive in any desired manner which can be combined with anti-rotation elements, that is to say corresponding grooves or other female molds at the outer surface of the tubing section, if necessary. In this connection, the realization of a chamfer at the transition between the tubing section and the collar of the abutment is particularly preferable. This chamfer is typically external to the contact area, that is to say to the area at which the abutment contacts the dental structure, and is thus subjected to lower surface pressure. Here, excessive adhesive can be carried off in a suitable manner by means of a correspondingly suitable configuration of an elongated or ring-shaped recess.

Subsequently to this chamfer the collar of the abutment extends substantially vertically towards the outside and comprises a relatively small axial height which can amount to between 0.1 mm and 1 mm, 0.1 mm and 2 mm and between 0.1 mm and 0.5 mm. This enables an adjustment to the emergence profile in an anatomically favorable manner.

BRIEF DESCRIPTION OF THE DRAWINGS

Further advantages, details and features may be taken from the following description of several exemplary embodiments of the invention in conjunction with the drawings, in which.

DETAILED DESCRIPTION

Figure 1:
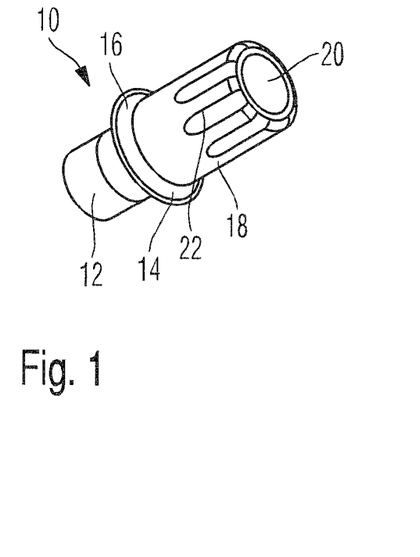
FIG. 1 shows a perspective schematic representation of an inventive dental prosthesis.
Figure 2:
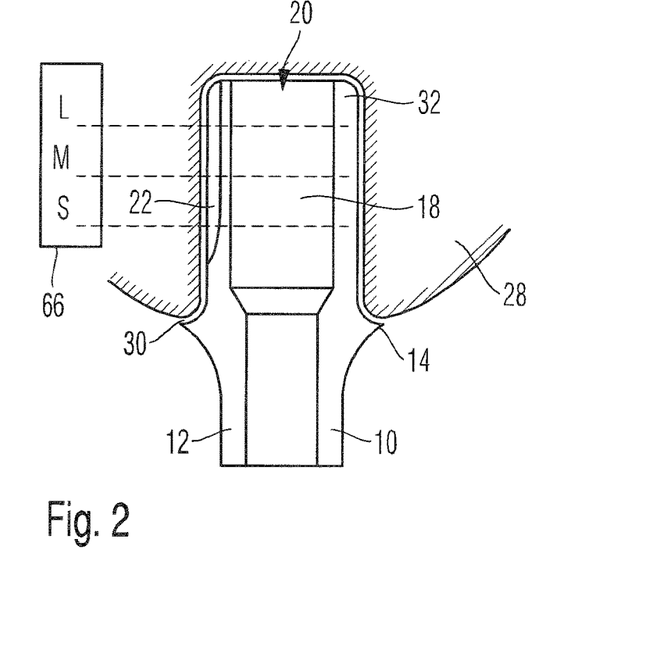
FIG. 2 shows the embodiment according to FIG. 1, however, in a sectional view.

In FIG. 1 an abutment 10 is illustrated as part of a dental prosthesis which can be connected to an implant for the production of a dental structure (see FIG. 2).

The abutment 10 comprises an implant connection 12 which is able to be supported in a torque-proof manner on an implant. The anti-rotation mechanism realized in this respect can be configured, for instance, with a hexagonal outer shape or a hexagonal inner shape.

A collar 14 is formed above the implant connection 12 which collar merges into the implant connection 12 across a relatively large radius (see FIG. 2). The collar 14 tapers off in a relatively pointed manner and its top ends in an internal radius 16 which is even considerably smaller than the radius of the implant connection 12.

Subsequent to the collar 14 and starting from it, a tubing section 18 or upper part of the abutment extends. The tubing section 18 comprises a central recess 20 which is suitable for receiving an implant screw (see FIG. 8). Towards its upper end, the tubing section 18 comprises a slightly conical shape; the cone angle is, for instance, 3°.

For providing an anti-rotation device between the implant on the one hand and the dental structure on the other hand the abutment 10 comprises a plurality of grooves 22 which are evenly distributed around the periphery and which extend in an open manner towards the top and vertically across a chamfer in a closed manner towards the bottom.

It can be seen from FIG. 2 how a dental structure 28 can be connected to the tubing section 18. As is schematically suggested in FIG. 2, an adhesive gap 30 extends between the dental structure 28 on the one hand and the collar 14 and the tubing section 18 on the other hand. The dental structure 28 comprises flanges which face inwards and which are intended to extend into the grooves 22 of the tubing section 18 in order to ensure that no rotation occurs.

It can also be seen from FIG. 2 that the implant can basically be provided with several lengths. The three different lengths presented herein only differ in the height of the tubing section 18, while the shape of the implant does not exhibit any difference apart from that.

All the shapes "L", "M" and "S" have in common that they end in an end radius 32. In this way, notch effects with respect to the dental structure 28 are prevented.

Figure 10:
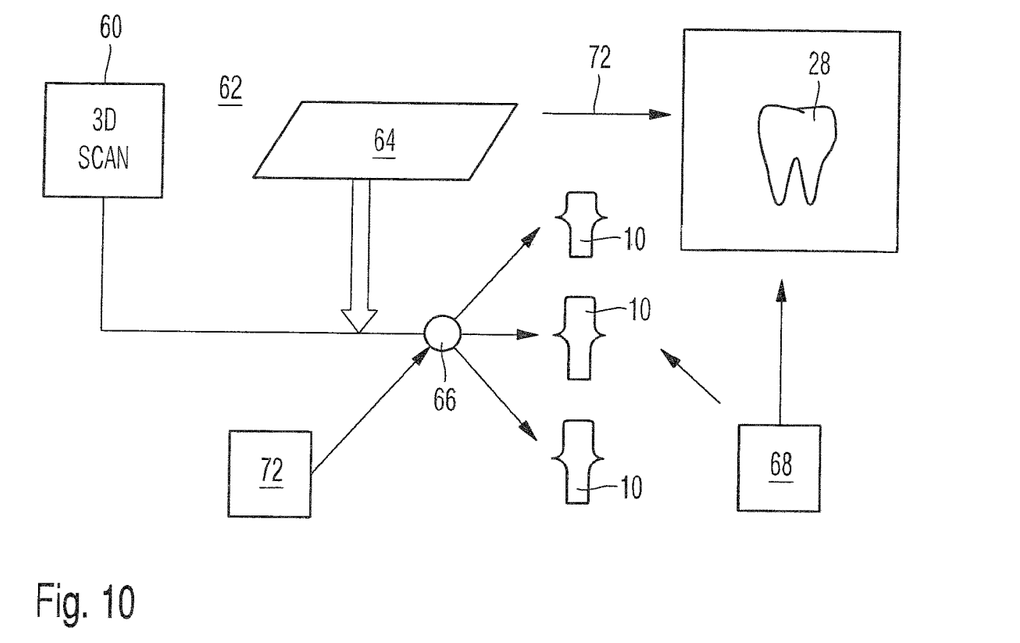
FIG. 10 shows a schematic representation of an inventive dental prosthesis production device illustrating the part relevant for the invention.

Now, the inventive selection device (FIG. 10) selects the appropriate shape depending on the size and shape of the dental structure 28. Additionally, if necessary, it is possible to perform a fine adjustment by determining the exact desired height of the tubing section 18 by means of the CAD/CAM device (FIG. 10).

The height adjustment and the selection are also performed depending on the type of the tooth: While anterior teeth are rather slim and tall, molars comprise dental material in the approximal or buccal/lingual direction.

The shear forces introduced by the masticatory forces are correspondingly larger with molars, but due to the larger wall thickness in the area surrounding the tubing section 18 molars are also more stable such that a higher surface pressure in the tubing section 18 is possible. In the exemplary embodiment illustrated, the depth of the grooves 22 amounts to approximately half of the wall thickness of the tubing section 18, and it is to be understood that, if necessary, the selection device can also select an abutment for anterior teeth, which has a slightly smaller wall thickness, for instance 0.5 mm instead of 0.6 mm. In this way, the wall thickness of the dental structure can even be increased slightly.

According to the invention it is particularly favorable that the selection device automatically selects a suitable abutment based on the result that has already been determined, that is to say the dental prosthesis to be produced, and that it adjusts this abutment optionally in a patient-specific manner, reduces its height or adjusts the rest of it.

Figure 8:
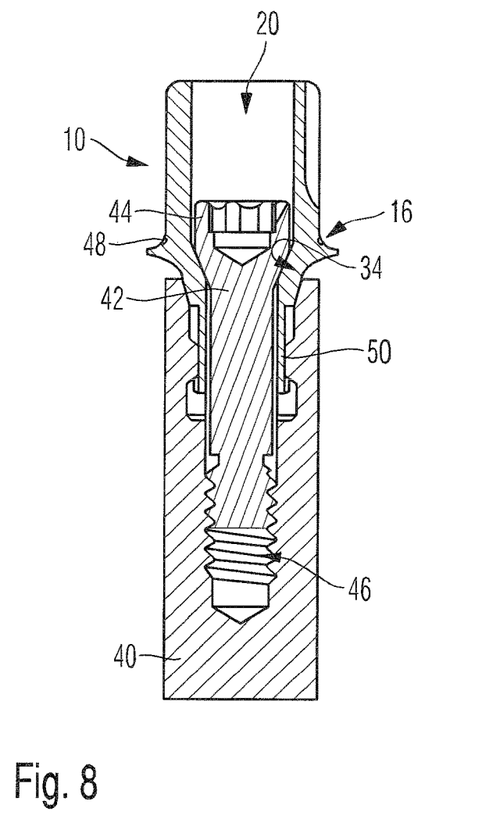
FIG. 8 shows the embodiment according to FIG. 7 in a top view.

It is to be understood that the shape of the abutment is compatible with that of the implant, as can be seen from FIG. 8.

When selecting the abutment, the selection device selects an abutment whose height is the same or larger than a target height such that sufficient material is always provided for the machining process which may be required.

According to the invention it is important in this connection that the end radius 32 is attached or kept quasi automatically during machining or milling.

In this connection, the dental prosthesis production device also produces at least the inner structure of the dental structure 28 in a suitable manner and adapted to the result of the selection by the selection device and apart from that also adapted to the shape of each abutment 10 used for the production of the dental prosthesis.

As the outer shape of the dental structure 28 can already be determined based on a detection of the oral situation of the patient by means of a 3D scan, it is also possible and particularly favorable if the scanning result forms a virtual shape of the restoration to be produced based on the shape of neighboring teeth of the dental prosthesis to be produced and at the same time performs the division of this shape into implant, abutment and dental structure.

In this connection, it is preferable if the production device refers to an abutment library which has available a certain number of sizes of the abutment depending on the type of the dental prosthesis, wherein then, depending on the size, the production device takes into account the forces to be absorbed and the selection device selects the abutment also based on this.

It is to be understood that, in this connection, the height level of the occlusal surface of the dental structure is preferably taken into consideration that is to say that the abutment is shortened to such an extent or is selected in a shorter form by the selection device that sufficient dental material, such as ceramic material, is available between the upper end of the abutment and the occlusal surface.

Preferably, the groove 22 or the plurality of grooves 22 extends across a significant part of the height of the tubing section 18 of the abutment 10.

In a plurality of grooves 22 the surfaces which are available for the transmission of torques are larger than if only one groove is realized (FIG. 3 and FIG. 4) such that in this case partially covering the height of the tubing section 18 is sufficient, as can be seen from FIG. 2. Even with the smallest height or greatest reduction according to "S" a part of the height of the groove 22 is still available for the anti-rotation device.

Figure 3:
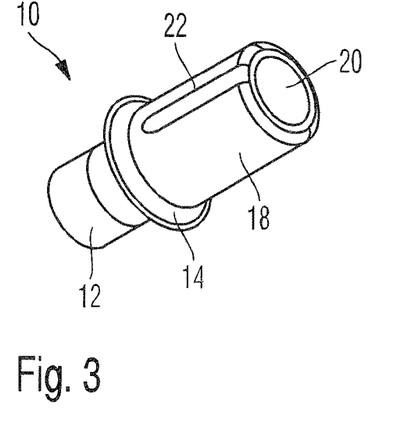
FIG. 3 shows a modified embodiment of an inventive dental prosthesis according to FIG. 1.
Figure 4:
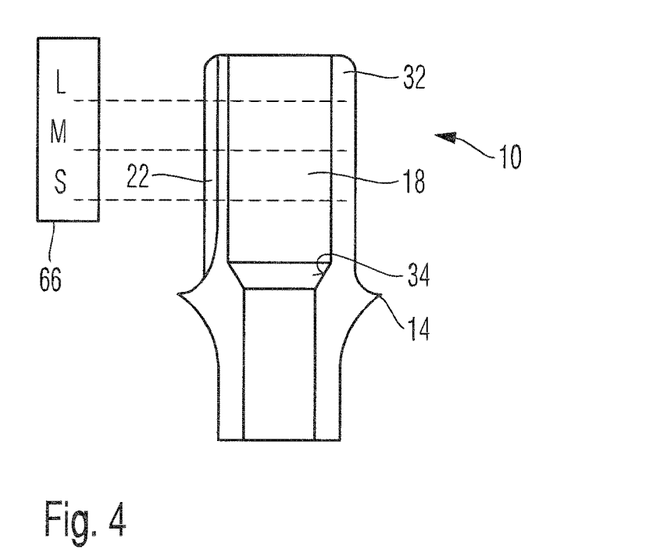
FIG. 4 shows the embodiment according to FIG. 3 in a sectional view.

In contrast, FIG. 3 illustrates an embodiment of an abutment 10 with only one groove 22. As can be seen from FIG. 4, it extends to the collar 14 such that sufficient torque-active surface is still available even if the tubing section 18 has been shortened as greatly as possible.

Preferably, the flute (groove 22) comprises one end radius or one chamfer, respectively, in order to prevent abrupt changes in stiffness of the abutment.

The wall thickness of the tubing section can be constant from the collar 14 to the end radius 32, or can decrease slightly, for instance by 10% to 15%, wherein it is to be understood that the internal diameter of the tubing section 18 is constant across the height as in the recess 20 an implant screw with its head must be received.

In a way known per se the abutment 10 comprises an internal taper 34 in the area of the collar or slightly above, and the head of the implant screw is in contact with the internal taper.

Figure 5:
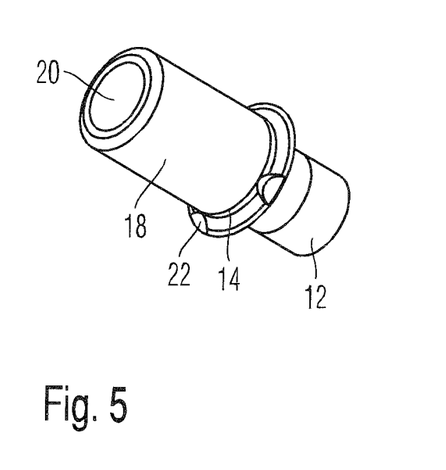
FIG. 5 shows a further modified embodiment of the inventive dental prosthesis in a perspective view.

In contrast, FIG. 5 illustrates an embodiment which is modified even further. In this solution the anti-rotation device is realized by means of a groove 22 in the area of the collar 14, while the tubing section 18 is free of grooves or flutes (grooves 22).

Figure 6:
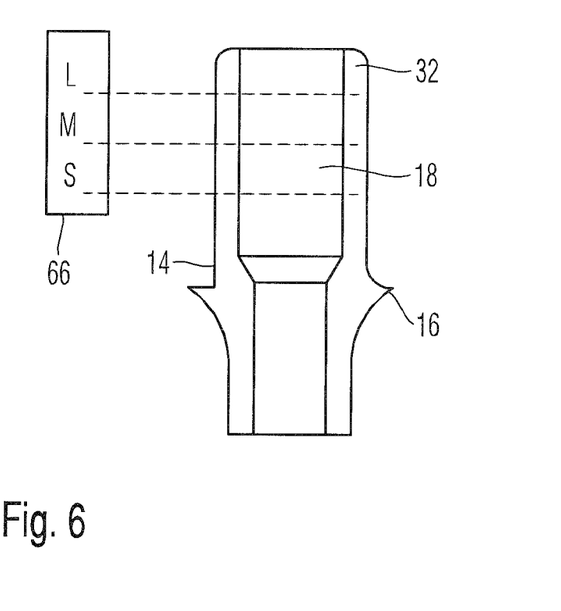
FIG. 6 shows the embodiment according to FIG. 5 in a sectional view.

Even if only two grooves 22 or flutes 18 are to be seen in FIG. 5 and FIG. 6 in the area of the collar 14, it is to be understood that a plurality of corresponding grooves is preferably provided to maximize the surfaces suitable for transferring torques.

Figure 7:
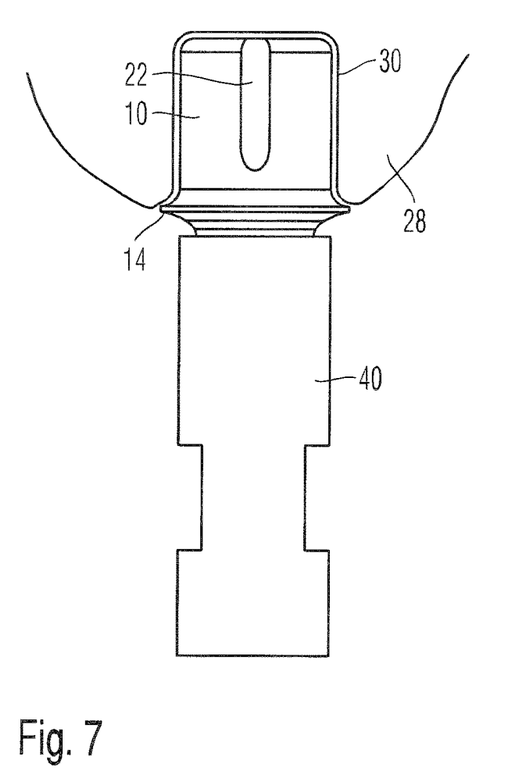
FIG. 7 shows a view of a further embodiment of an inventive dental prosthesis in a side view.

In FIG. 7 an abutment is shown slightly enlarged in a position screwed into the implant. The area between the collar 14 and the upper end of the implant 40 is smoothed in a way known per se with dental cement for providing a suitable emergence profile; due to the small height of the collar 14 an adaptation to the requirements of the patient is possible to a large extent.

In this respect, the transition towards the dental structure 28 is important which is in connection with the abutment 10 by means of the adhesive gap 30.

It is to be understood that any desired suitable biocompatible adhesive or dental cement can be used as a filling material for the adhesive gap 30.

It can be seen from FIG. 8 how an implant screw 42 can be inserted into the recess 20. The screw head is, for instance, provided with an inbus structure which has been modified towards a TORX structure and the screw head 44 fills the recess 20 radially almost completely.

Figure 9:
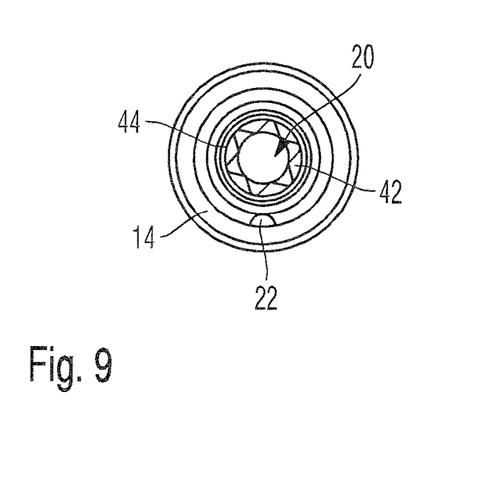
FIG. 9 shows the embodiment according to FIGS. 7 and 8 in a sectional view.

It can be seen from FIG. 9 that the screw head 44 of the implant screw 42 contacts the internal taper 34 of the abutment, via the taper support thereof, in order to provide for the screw connection 46. Screws comprising a vertical to flat shoulder also come into question for this purpose, and it is therefore also apparent that an anti-rotation mechanism 50 is realized between the implant 40 and the abutment 10, for instance in the form of hexagonal surfaces which fit one another.

It is to be understood that, in practice, the implant 40 is provided with an external thread known per se even if this is not shown in the Figures.

As can be seen from FIG. 8, in the area of the internal radius 16 an undercut 48 is formed which serves to receive adhesive which drains off. Furthermore, in this embodiment it is provided to compress the surface of the abutment after the shortening process which has been performed optionally, for instance by exposing it to a jet of a granular substance.

In a further modified embodiment it is provided instead to provide the abutment with a single- or two-colored coating.

FIG. 10 illustrates the schematic configuration of a dental prosthesis production device 62.

Initially, the oral situation of the patient, in particular the neighboring teeth of the dental prosthesis to be produced, is scanned by means of a scanning device 60. In this way, the scan data are present in the dental prosthesis production device 62. Based on this, the dental prosthesis production device 62 develops a dental prosthesis in a way known per se, for instance as a virtual hybrid between both the neighboring teeth or in any other suitable manner corresponding to the position of the dental prosthesis in the mouth of the patient.

Thus, the dental prosthesis production device 62 defines the outer shape of the dental structure 28, also including the height level for the provision of a suitable occlusal surface (or incisal surface) with respect to the antagonist of the dental prosthesis.

Thus, apart from the height level and position, the outer shape of the dental structure is also determined, also including the dimensions of the dental structure in the approximal and lingual/buccal direction. Based on this and based on the data comprised in a library 64 of abutments (and optionally implants) a selection device 66 selects a suitable abutment. The abutment 10 is selected such that its height fits the virtual internal space of the dental prosthesis, that is to say such that sufficient ceramic dental material is available for the support at the tubing section 18. Furthermore, the wall thickness of the dental structure is taken into consideration as a marginal condition in the selection process, for instance >1 mm with anterior teeth and >2 mm with molars and pre-molars.

It is to be understood that these values can be adapted to the requirements to a large extent.

The selection device 66 is part of a CAD station and determines the suitable abutment based on this, which can optionally be shortened in order to optimize it. A CAM device 68 serves this purpose and performs the shaping step which comes up in this respect and which in particular also shapes the end radius 32 of the abutment automatically.

Furthermore, the selection device 66 also transmits shape data 72 for providing the internal shape of the dental structure 28 which is produced by the CAM device 68.

It is to be understood that a separate milling cutter can be realized instead for processing the abutment 10.

Preferably, in a test step it is further checked at the same time if the inner surface of the dental structure 28 fits the respective abutment 10 to be processed. This can be done either by adaptation—without adhesive—or by means of a scan for which the scanning device 60 can be used again.

In this connection, it is checked as part of a test step if the fit is appropriate or sufficient in order to ensure the desired height level on the one hand but also torque-proof mounting on the other hand.

If necessary, finishing is carried out in a finishing step again by means of the CAM device 28.

Figure 11:
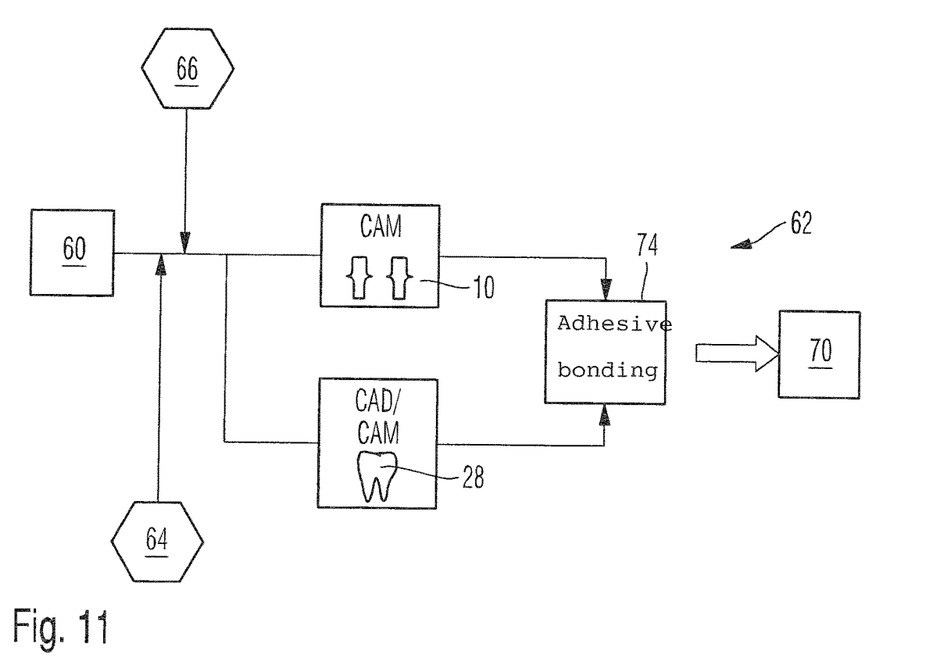
FIG. 11 shows a schematic representation of an inventive dental prosthesis production device illustrating the part relevant for the invention, however, in a modified embodiment.

From FIG. 11 a further embodiment of the dental prosthesis production device 62 is apparent. Again, scan data is initially provided which has been produced by the 3D scanning device 60. Based on this and using shape data from a library 64, the selection device 66 does not only determine the shape of the abutment 10 but also the outer shape of the dental suprastructure 28. This data which fits one another, also with regard to the height of the tubing section 18 in case of the abutment 10, is supplied to the corresponding production devices, and the height of the abutment 10 is shortened to "L", "M" or "S", if necessary. The associated radius is rounded off at the same time. The internal structure of the dental structure 28 is determined such that it matches the radius and produced by means of CAD/CAM, and, of course, at the same time also the outer structure.

As a result, the finished parts are available for providing the dental prosthesis. The dental prosthesis is now assembled in a step 74, wherein the dental structure 28 is adhesively bonded onto the abutment 10.

In a test step and optionally in a finishing step 70 the result is reviewed and finishing is carried out, if necessary, for instance by removing occlusal defects at the occlusal plane of the produced molar of the dental structure 28.

The invention claimed is:

1. A method for production of a dental prosthesis using a production device, comprising:
   providing an implant (40), an abutment (10) having a shape that is compatible with the implant (40) and having a cylindrical section, and a dental structure (28) which can be attached to the cylindrical section of the abutment, wherein the dental structure is made of a dental material, and
   providing a machining tool or CAM device,
   wherein the abutment is mounted on the implant (40) via a releasable connection, having an anti-rotation mechanism (50), and an anti-rotation device (22) being configured between the abutment (10) and the dental structure (28),
   wherein the anti-rotation device forms at least one flute or groove (22) at the cylindrical section of the abutment (10), the at least one flute or groove, in cross-sectional view, curved concavely, the at least one flute or groove extends across at least a part of the height of the cylindrical section to a distal end of the abutment, both the top of the cylindrical section of the abutment and the at least one flute or groove coming to end at a rounded edge on the distal end,
   shortening the cylindrical section of the abutment with the machining tool or CAM device such that the at least one flute or groove is/are maintained with the rounded edge and a concave curve after shortening, wherein the shape of the cylindrical section is configured such that the radius of the cylindrical section remains unchanged when the cylindrical section is shortened.

2. The method according to claim 1,
   wherein a selection device in connection with the machining tool or CAM device is provided for selecting the abutment (10) for fitting with the dental structure, and
   wherein the machining tool or CAM device shapes an end radius of the abutment automatically.

3. The method according to claim 2,
   wherein the machining tool or CAM device provides a predefined number of heights of the cylindrical section of the abutment (10), and the height suitable for the dental structure (28) can be selected by the selection device.

4. The method according to claim 2,
   wherein the selection device selects the abutment for theft dental prosthesis to match a diameter and type of the implant (40) and a diameter and type of the dental structure (28), and
   wherein machining tool or CAM device supplies shape data which relate to a patient-specific height of the selected abutment (10).

5. The method according to claim 1, comprising reducing in height the abutment (10) to a medium height or a minimum height.

6. The method according to claim 1, comprising finishing the dental structure (28) by calculating the data of the dental structure (28) to be produced based on outer geometry required by the dental structure and on data of the abutment (10) dimensions and forwarding the data to the CAM device.

7. The method according to claim 1, comprising determining a desired shape of the dental prosthesis based on an extraoral or intraoral 3D scan with the aid of a scanbody, by supplying the scanning result to the CAM device which, based on the shape of neighboring teeth of the desired dental prosthesis, forms a virtual shape of the restorations to be produced and which divides the virtual shape virtually into an implant (40), an abutment (10) and a dental structure (28).

8. The method according to claim 2,
   wherein, in the cylindrical section of the abutment (10), the at least one flute or groove (22) extends from the end radius of the abutment (10), across at least 70% of the height of the cylindrical section of the abutment.

9. The method according to claim 1,
   wherein the abutment comprises a collar (14) and wherein the at least one flute (22) or groove tapers towards the collar (14) of the abutment (10).

10. The method according to claim 1,
    wherein the abutment (10) is fabricated of a ceramic, plastic or metal material, and
    wherein after shortening the abutment (10), exposing the abutment to a jet of a granular sub stance.

11. The method according to claim 1,
    wherein the abutment (10) comprises a single-colored or two-colored coating comprising TiN or an anodization of TiN for the production of an aesthetic abutment surface,
    wherein both the single-colored or two-colored coating and aesthetic abutment surface comprises brighter shades which are similar to tooth color.

12. The method according to claim 1,
    wherein the dental material comprises one or more of ceramic and plastic,
    wherein the releasable connection comprises a screw connection (44),
    wherein the machining tool comprises a milling cutter.

13. The method according to claim 1,
    wherein the cylinder is shortened to a height selected from large, medium and small.

14. The method according to claim 1,
    wherein the abutment can be reduced to a height selected from two to three different lengths.

15. The method according to claim 1,
    wherein the at least one flute or groove (22) extends at least 80% of the height of a total area of the cylindrical section.

16. The method according to claim 10,
    wherein the metal material comprises titanium or a titanium alloy.

* * * * *